United States Patent [19]

Kolb et al.

[11] 4,184,262

[45] Jan. 22, 1980

[54] DEVICE FOR DETERMINING THE EXACT POSITION OF TWO MEMBERS LINEARLY DISPLACEABLE RELATIVE TO EACH OTHER

[76] Inventors: Alfred Kolb, Haus am Tannenberg, 6980 Wertheim; Karl Lahme, Tannenstrasse 46, 6983 Kreuzwertheim, both of Fed. Rep. of Germany

[21] Appl. No.: 890,026

[22] Filed: Mar. 24, 1978

[30] Foreign Application Priority Data

Apr. 1, 1977 [DE] Fed. Rep. of Germany ....... 2714521

[51] Int. Cl.² ............................................. G01B 11/04
[52] U.S. Cl. .............................. 33/125 R; 33/125 A; 33/125 C; 356/373
[58] Field of Search ............... 356/169, 170, 172, 373, 356/395; 250/237 G; 33/125 R, 125 C, 125 A, 125 T

[56] References Cited

U.S. PATENT DOCUMENTS

| | | | |
|---|---|---|---|
| 2,995,826 | 8/1961 | Brault | 33/125 T |
| 3,854,823 | 12/1974 | Loxham | 356/373 |
| 4,095,903 | 6/1978 | Feichtinger | 33/125 C |

FOREIGN PATENT DOCUMENTS

| | | | |
|---|---|---|---|
| 1303080 | 3/1971 | Fed. Rep. of Germany | 33/125 R |
| 1221417 | 6/1960 | France | 33/125 T |
| 455303 | 6/1968 | Switzerland | 33/125 A |

*Primary Examiner*—John W. Shepperd
*Attorney, Agent, or Firm*—Lawrence E. Laubscher

[57] ABSTRACT

An apparatus is disclosed for determining the position of one of a pair of linearly displaceable members relative to the other, including a scale secured to one member parallel with the axis of linear displacement, and an electrooptical scanning head connected with the other member for pivotal movement about an axis transverse to the axis of linear displacement. The scanning head is spring-biased toward engagement with the scale, whereby the scanning head is pivoted in accordance with the configuration of the correction ruler.

1 Claim, 4 Drawing Figures

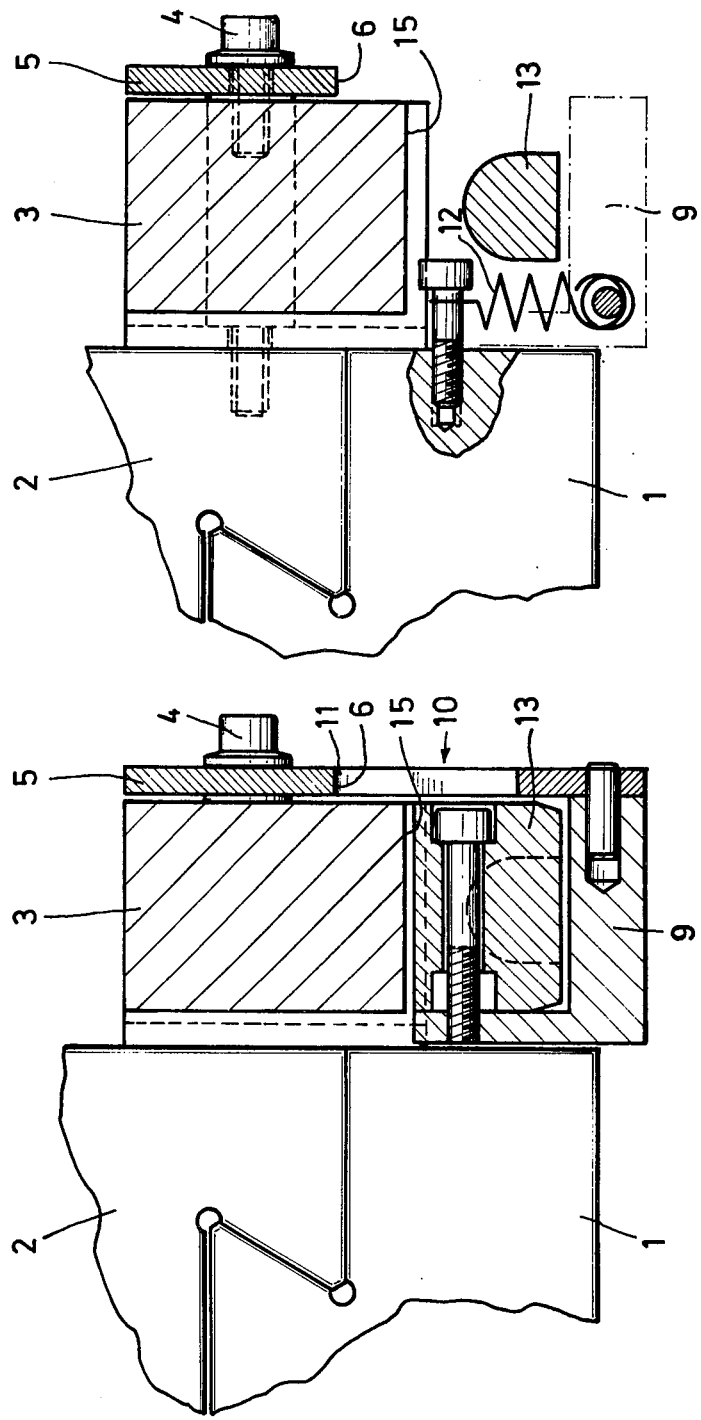

DEVICE FOR DETERMINING THE EXACT POSITION OF TWO MEMBERS LINEARLY DISPLACEABLE RELATIVE TO EACH OTHER

BRIEF DESCRIPTION OF THE PRIOR ART

The invention relates to a device for determining the exact position of two members which are linearly displaceable relative to each other, particularly a workpiece support and the table on which it rests, comprising a scale of length secured to the first member and an electrooptical scanning head for the graduation on the scale of length secured to the second member and displaceable therewith along the scale of length.

In recent times, one has taken to scanning a scale of length, for example, a glass scale with engraved graduation marks, secured to a displaceable member, with an electrooptical scanning head held on the other displaceable member, in order to determine the relative position of two members displaceable relative to each other, for instance, the workpiece support and the associated tool, in, for example, machine tools or the like. This scanning head can count the graduation marks on the glass scale and indicate the result directly—possibly after the conversion into units of length—in digital form. Since glass scales can be graduated very finely and with a very high degree of precision (optical grids) this measurement technique enables very accurate determination of position.

Nevertheless, errors do occur with such a measurement device. These can be caused, for example, by different weight loads being applied or by wear and tear phenomena.

Such deviations are known per se and intensive efforts have been made in the past to find possible ways of compensating for them.

For example, when length is determined using stationary precision gauge blocks it is known to provide a scannable compensation ruler along which a follower or feeler member travels upon displacement of the two members, and while doing so changes the effective length of the precision gauge block (vide German Pat. No. 1,303,080). With this measuring device it is, however, necessary that each measurement which is to be set be composed of precision gauge blocks which must be inserted in the machine tool for the measurement.

It is also known (vide German published patent application No. 1,231,595) to convert the longitudinal displacement movement into a rotational movement of a rotor rotating in a stator, to measure the rotation of the rotor in the deviations.

For this purpose there is provided a follower or feeler member travelling along a compensation ruler and more or less turning the stator through the intermediary of a ring gearing in dependance upon the shape of the compensation ruler. This disadvantage of this device is that extremely complicated gearing means are required both for converting the longitudinal displacement into a rotational movement and for transmitting the compensation displacement to the stator. This construction therefore requires a high degree of expenditure and there is the danger of additional inaccuracies occurring owing to the play in the gearing means.

Furthermore, the compensation techniques described above cannot be used for effecting compensation with the above-described optical position determining system which operates substantially more accurately.

SUMMARY OF THE INVENTION

The object underlying the invention is to improve an optical position determining system of the above-described kind for a continuous measuring process such that measurement errors can be compensated for without the necessity for any complicated gearing means.

In accordance with the invention, this object is attained in a device of the first aforementioned kind in that the electrooptical scanning head is mounted on the second member for pivotal movement around an axis extending transversely to the direction of displacement, and in that the scanning head comprises a follower or feeler member which upon relative displacement of the members glides along a correction ruler and more or less pivots the scanning head around the axis in dependence upon the shape of the correction ruler.

In accordance with the invention, the varying shape of the correction ruler is converted in the simplest way into a pivotal movement of the scanning head around an axis extending transversely to the direction of displacement. Different pivotal movement enables the scanning head to "see" various areas of the scale of length. If the correction ruler is of suitable shape, the scanning head is always pivoted exactly far enough for it to produce a corrected linear measurement.

It is advantageous for the follower or feeler member to be pressed against the correction ruler by means of a spring. The correction ruler can be adjustably secured to the first member.

BRIEF DESCRIPTION OF THE DRAWING

The following description of preferred embodiments of the invention serves in conjunction with the drawings to explain the invention in greater detail, wherein

FIG. 2 is a sectional view taken along line 2—2 in FIG. 1.

FIG. 3 is a sectional view taken along line 3—3 in FIG. 1; and

DETAILED DESCRIPTION

Figure 1:
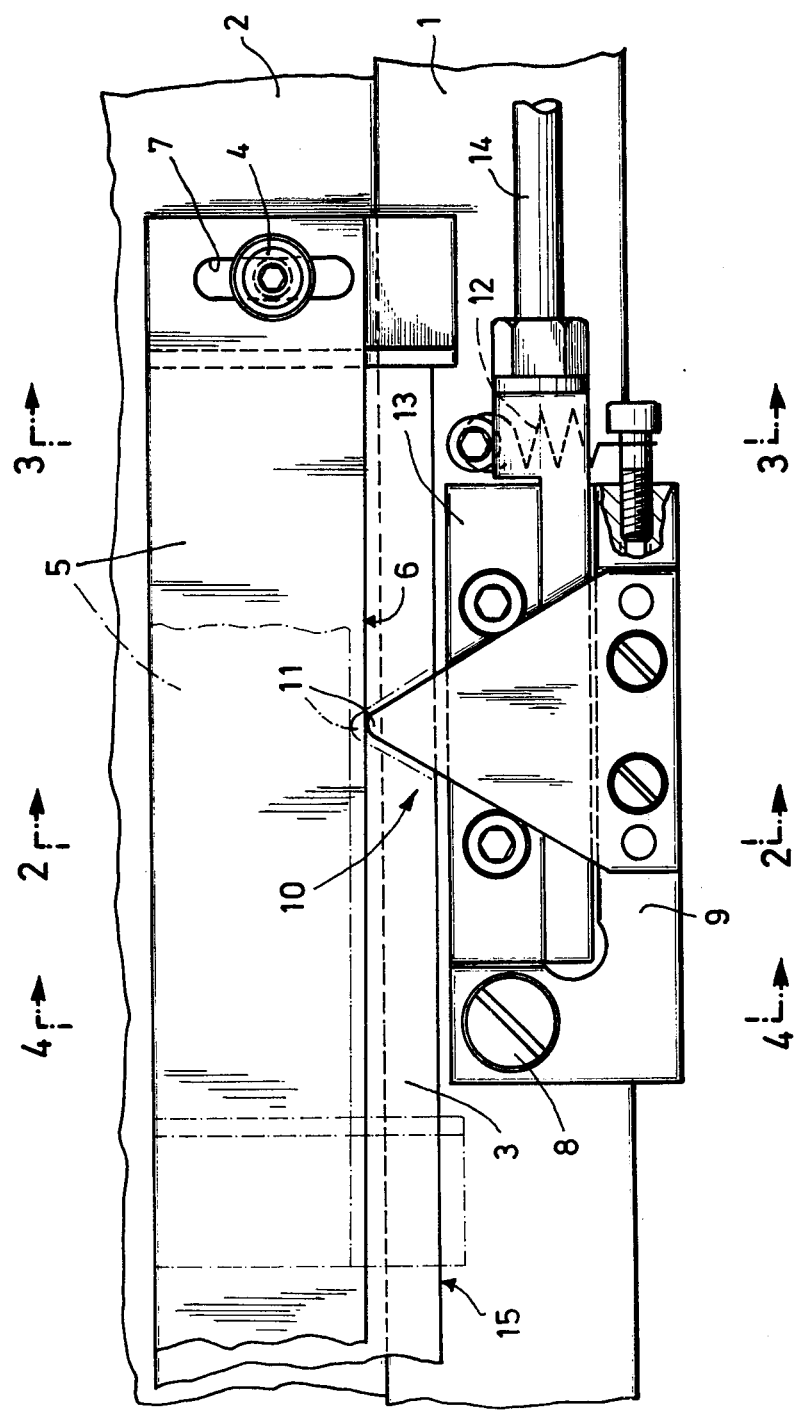
FIG. 1 is a fragmentary side view of the inventive position determining device.
Figure 4:
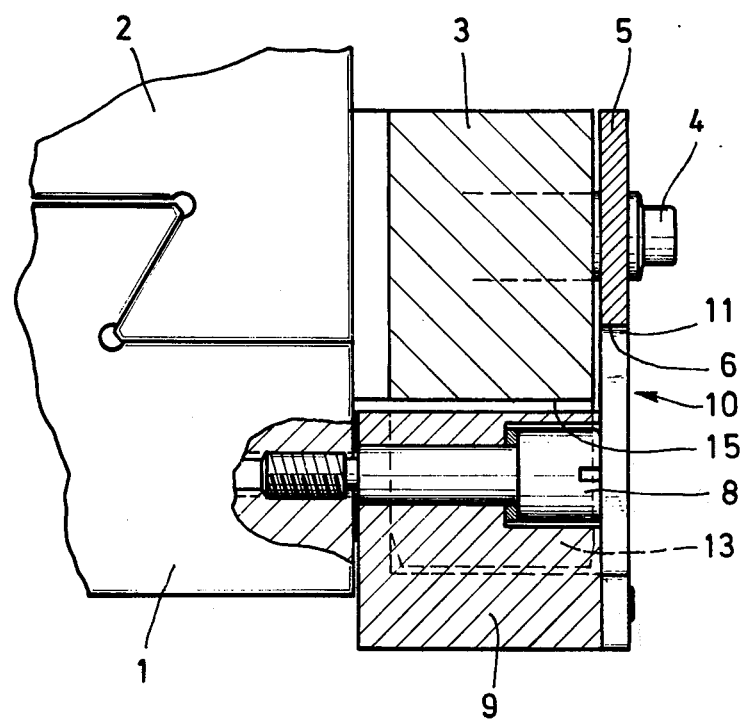
FIG. 4 is a sectional view taken along line 4—4 in FIG. 1.

The device described hereinafter serves to determine the position of two members which are displaceable relative to each other. In the embodiment shown these are a support 1 and a slide 2 mounted for displacement thereon. A scale of length 3, for example, a metal housing with a glass measurement scale of a design known per se is rigidly connected to the slide 2.

A correction ruler 5 whose lower edge 6 is aligned with respect to the slide 2 in a manner to be described hereinafter is also secured to the slide 2 by means of screws 4. For this purpose the correction ruler 5 comprises longitudinal holes 7 so that it can be adjustably secured to the slide 2.

A holder member 9 is mounted for rotation on the support 1 by means of a screw 8 such that it is pivotable about an axis extending vertically with respect to the direction of displacement of the slide. Secured to the holder member 9 is a follower member 10 which in the embodiment shown is substantially triangular shaped and whose tip 11 abuts the lower edge 6 of the correction ruler 5. For this purpose the holder member 9 is pivoted about the axis formed by the screw 8 by a tension spring 12 secured on the one hand to the support 1 and on the other hand to the free end of the holder member 9, such that the follower member 10 abuts the correction ruler 5 by the action of the spring. The holder member 9 serves to accommodate an electrooptical scanning head 13 of a design known per se, which cooperates with the scale of length 3 in a manner known per se. The scanning head 13 is rigidly connected to the holder member 9 and connected to an indicator device by a cable 14 in a manner which is not illustrated.

Upon displacement of the slide 2 with respect to the support 1, the follower member 10 glides along the lower edge 6 of the correction ruler 5 and while doing so pivots the holder member 9 and with it more or less the scanning head 13 in conformance with the shape of the lower edge 6. The different areas on the measurement scale "seen" by the scanning head are determined by the pivotal movement, and the number of graduation marks read off is therefore either decreased or increased, depending on the direction of the pivotal movement. The lower edge of the correction ruler 5 is shaped so as to enable corresponding compensation to be effected. This can, for example, be achieved by adjusting the correction ruler on the slide 2. In FIG. 1 the lower edge 6 extends at an angle with respect to the lower edge 15 of the measurement scale. The left portion of the correction ruler is indicated by dot-and-dash lines in FIG. 1, and it is apparent that in the left position (FIG. 1) the follower member 10 is further displaced in an upward direction, so that the holder member 9 is pivoted in an anticlockwise direction. The lower edge of the correction ruler need not be rectilinear, it can have any required shape.

As is apparent from the description, the mechanical set-up of this length measuring device is extremely simple. Not only can length measuring systems of this kind which are already in existence be thereby converted into compensated, corrected systems in the simplest way, increased accuracy is also attained, as no additional errors occur by way of complicated mechanical conversions.

We claim:
1. Apparatus for determining the position of one of a pair of linearly displaceable members relative to the other, said members having contiguous horizontal surfaces, comprising
   (a) a horizontal scale (3) secured to one of said members adjacent said horizontal surfaces, said scale having a horizontal scale surface (15) adjacent the other of said members;
   (b) electrooptical scanning head means (13);
   (c) holder means (9) pivotally connected with the other of said members for supporting said scanning head means adjacent said scale horizontal surface, said holder means being pivotable about a horizontal pivot axis (8) which is normal to a vertical plane which contains the axis of linear displacement of said members;
   (d) spring means (12) pivotally biasing said holder means in the direction of said scale; and
   (e) correction means for compensating for variations in the scale measurement, comprising
      (1) a correction ruler (5) having a generally horizontal correction guide edge (6);
      (2) means (4, 7) adjustably connecting said correction ruler with said scale at a generally horizontal position at which said correction guide edge is adjacent and spaced from said scale horizontal surface; and
      (3) follower means (10) connected with said holder means for abutting engagement with said ruler correction guide edge, whereby upon displacement of one of said members relative to the other, said follower means pivots said holder means to vary the area of said horizontal scale surface viewed by said scanning head means in accordance with the configuration of said correction ruler, thereby to vary the number of graduations read off said scale in accordance with the direction of pivotal movement of said holder means.

* * * * *